(12) United States Patent
Pham et al.

(10) Patent No.: US 9,432,954 B2
(45) Date of Patent: Aug. 30, 2016

(54) DETERMINATION OF DEVICE BODY LOCATION

(71) Applicant: Apple Inc., Cupertino, CA (US)

(72) Inventors: Hung A. Pham, Oakland, CA (US); Adam S. Howell, Oakland, CA (US)

(73) Assignee: Apple Inc., Cupertino, CA (US)

(*) Notice: Subject to any disclaimer, the term of this patent is extended or adjusted under 35 U.S.C. 154(b) by 42 days.

(21) Appl. No.: 13/913,271

(22) Filed: Jun. 7, 2013

(65) Prior Publication Data

US 2014/0364102 A1    Dec. 11, 2014

(51) Int. Cl.
*H04W 52/28* (2009.01)
*H04W 52/36* (2009.01)

(52) U.S. Cl.
CPC ......... *H04W 52/285* (2013.01); *H04W 52/283* (2013.01); *H04W 52/367* (2013.01)

(58) Field of Classification Search
CPC ............. H04W 52/246; H04W 52/52; H04W 52/283; H04W 52/367; H04B 1/3838; H04B 1/401; H04B 17/00; Y02B 60/50; H01Q 1/243
USPC .............................. 455/550.1, 73, 115.1, 566
See application file for complete search history.

(56) References Cited

U.S. PATENT DOCUMENTS

| | | | | |
|---|---|---|---|---|
| 8,775,103 B1* | 7/2014 | Jayaraj | ................. | H03K 17/955 702/57 |
| 2009/0305742 A1 | 12/2009 | Caballero et al. | | |
| 2010/0033422 A1* | 2/2010 | Mucignat et al. | ............ | 345/156 |
| 2011/0250928 A1* | 10/2011 | Schlub et al. | ............. | 455/550.1 |
| 2013/0122827 A1 | 5/2013 | Ali et al. | | |
| 2013/0172045 A1* | 7/2013 | Caballero | ............ | H04B 1/3838 455/552.1 |
| 2013/0191908 A1 | 7/2013 | Klein | | |

FOREIGN PATENT DOCUMENTS

| | | |
|---|---|---|
| KR | 10-2011-0030534 | 3/2011 |
| KR | 10-2013-0010120 | 1/2013 |
| TW | 507460 | 10/2002 |
| WO | 2009/149023 | 12/2009 |

OTHER PUBLICATIONS

Extended European Search Report, dated Jun. 10, 2014, corresponding to European Application No. 14161348.9, 7 pages.
Yi, Ren. Translation of Chinese Office Action from Chinese Patent Application No. 201420275048.9. 4 pages.
Thanabalasingham, Thayaparan. Australian Office Action Received in Australian Patent Application No. 2014100524. 5 pages.
Korean Office Action in Application No. 10-2014-63985, dated Apr. 23, 2015, 6 pages (with English translation).
Van Der Westhuizen, Marthinus. Australian Office Action Received in Australian Patent Application No. 2014202757. 3 pages.

(Continued)

*Primary Examiner* — Vladimir Magloire
*Assistant Examiner* — Majid Syed
(74) *Attorney, Agent, or Firm* — Fish & Richardson P.C.

(57) ABSTRACT

In some implementations, a mobile device can analyze motion sensor data during a voice call to determine whether the mobile device is on a stationary object or worn on a user's body (e.g., in the lap or pocket of a user of the mobile device). The mobile device can adjust the transmit power level of the telephony transceiver during the voice call based on the determination.

18 Claims, 7 Drawing Sheets

(56) References Cited

OTHER PUBLICATIONS

Translation in Office Action of Taiwanese Patent Application No. 103118136. 3 pages.

Australian Office Action in Application No. 2015202940, dated Apr. 27, 2016, 4 pages.
Korean Office Action in Application 10-2015-0075075, dated Apr. 15, 2016, 14 pages.

* cited by examiner

DETERMINATION OF DEVICE BODY LOCATION

TECHNICAL FIELD

The disclosure generally relates to motion analysis on a mobile device.

BACKGROUND

Mobile devices often include telephony features that allow users to receive and place voice calls over a wireless network. For example, modern smartphones include wireless transceivers that allow the smartphones to receive and place telephone calls over cellular voice and/or data networks (e.g., CDMA, 2G, 3G, 4G LTE, etc.). These wireless transceivers can transmit at different power levels. Transmitting at high power levels can improve the quality of the voice calls. Transmitting at low power levels may be required when the mobile device is worn on or near the user's body to comply with government regulations.

SUMMARY

In some implementations, a mobile device can analyze motion sensor data during a voice call to determine whether the mobile device is on a stationary object (e.g., table) or worn on a user's body (e.g., in the lap or pocket of a user of the mobile device). The mobile device can adjust the transmit power level of the telephony transceiver during the voice call based on the determination.

Particular implementations provide at least the following advantages: The user can experience better quality voice calls when the mobile device is on a stationary object (e.g., a table) during voice call because the voice call can be transmitted using a high transmission power level.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

In some implementations, a mobile device can be configured with one or more motion sensors. For example, a motion sensor can be an accelerometer, gyroscope or other type of motion sensor. In some implementations, the mobile device can be configured with telephony components that allow a user to make and receive telephone calls. For example, telephony components can include one or more radio frequency transceivers that are configured to access one or more radio access technologies (e.g., GSM, UMTS, 2G, 3G, LTE, etc.).

In some implementations, the mobile device can be configured to adjust the transmission power of the telephony components when the mobile device connects to a voice call. For example, the mobile device can be configured to adjust the transmission power based on whether the mobile device is on a stationary object (e.g., a table) or worn on the user's body (e.g., on the user's lap, in the user's pocket, etc.).

Figure 1:
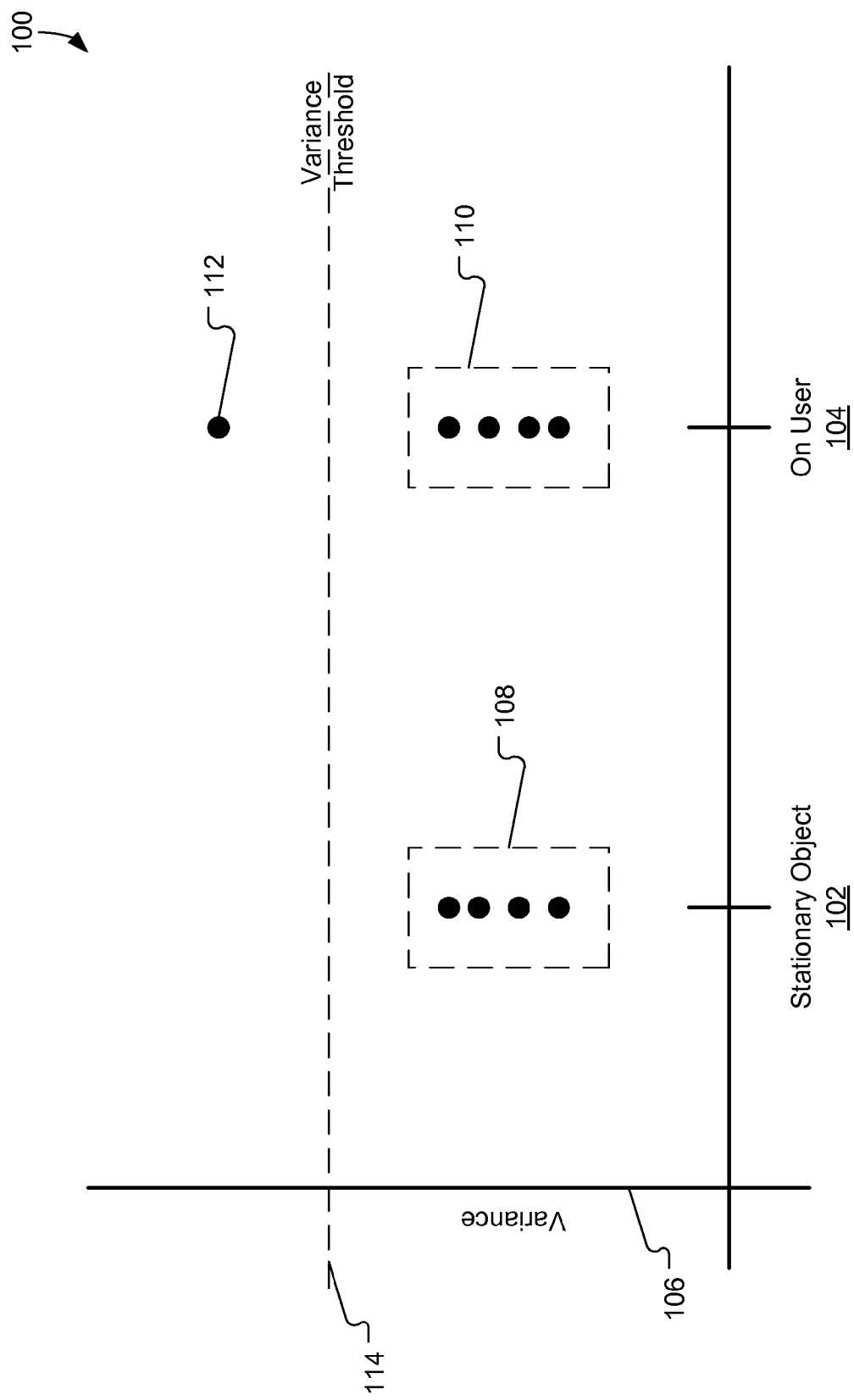
FIG. 1 illustrates an example graph showing motion variance of the mobile device for stationary object and on user positions.

FIG. 1 illustrates an example graph 100 showing motion variance of the mobile device for stationary object 102 and on user positions 104. The vertical axis 106 of graph 100 indicates the amount of variance. In some implementations, the determination of whether the mobile device is on a stationary object or worn by the user can be based on the variance in magnitude (i.e., amplitude) of a motion signal generated by the mobile device's motion sensor. For example, when the mobile device is on a stationary object 102 (e.g., a table), the variance in the motion signal magnitude (i.e., amplitude) will be small, as demonstrated by variance measurements 108. When the mobile device is on the lap or in the pocket of a user, the variance of the motion signal will be similar to that of the motion signal when the mobile device is on a stationary object, as demonstrated by variance measurements 110. However, when the mobile device is worn on the user's body, the user will eventually move and thereby create a magnitude spike in the motion signal that will temporarily increase the variance of the motion signal, as indicated by variance measurement 112. When the mobile device detects that the variance of the motion signal has exceeded a variance threshold 114 (e.g., a predefined, empirically determined threshold), the mobile device can determine that the mobile device is located or positioned on the user's body (e.g., lap, pocket, etc.). If the mobile device does not detect the variance increase within a period of time (e.g., a predefined, empirically determined period of time), then the mobile device can determine that the mobile device is located or positioned on a stationary (e.g., inert, inanimate) object.

Figure 2:
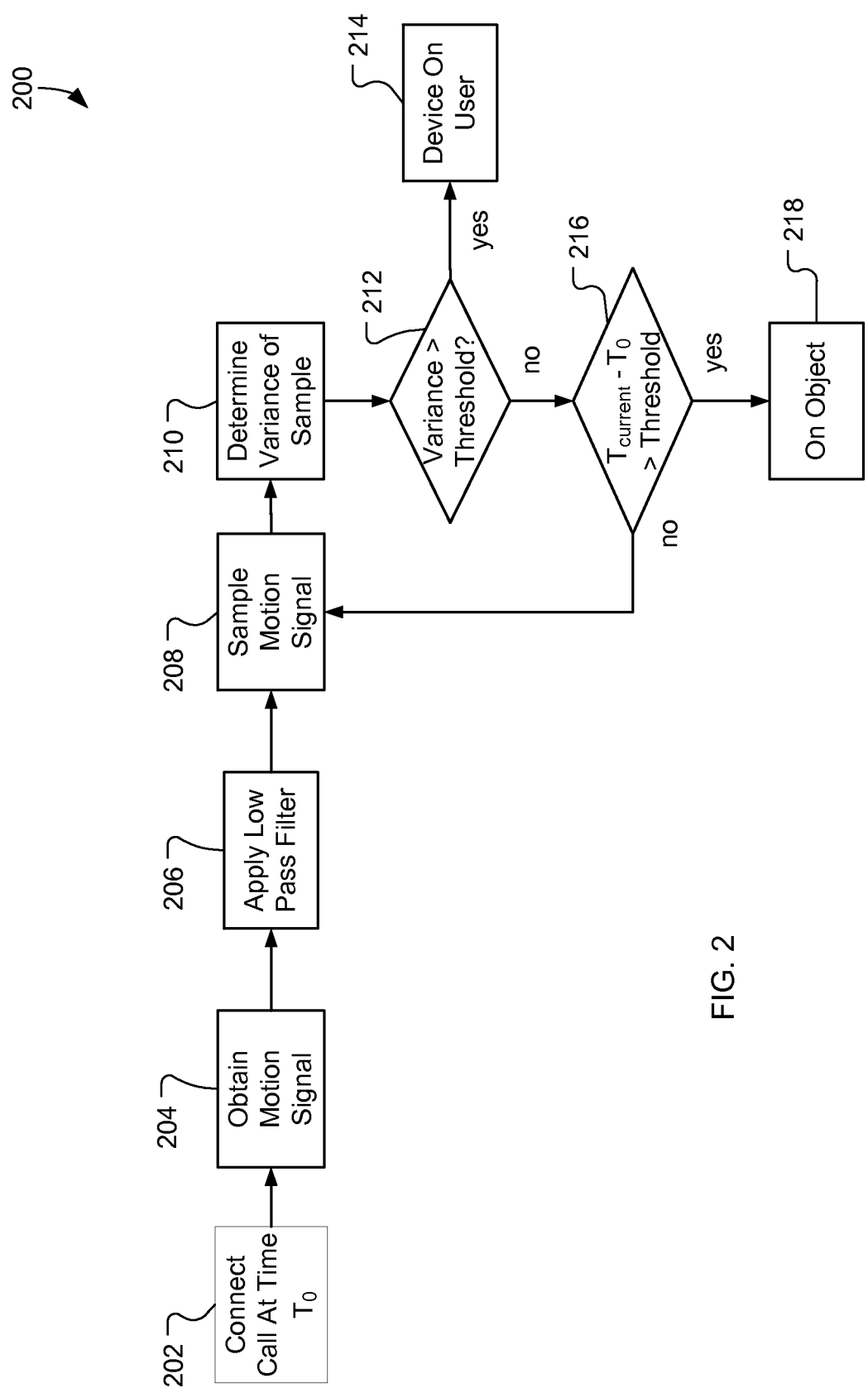
FIG. 2 is a flow diagram of an example process for determining whether the mobile device is on a stationary object or on a user.

FIG. 2 is a flow diagram of an example process 200 for determining whether the mobile device is on a stationary object or on a user. In some implementations, the mobile device can connect to a voice call 202 at a time $T_0$ (e.g., $T_0$ is the time when the call is connected). For example, the mobile device can be configured with telephony features that allow a user to place and receive voice calls. When the mobile device connects to a voice call, the mobile device can obtain motion data (e.g., a motion signal) from a motion sensor of the mobile device 204. For example, the mobile device can generate motion signal that indicates the amount (e.g., magnitude and frequency) of motion over time based on motion data received from the motion sensor. The mobile device can apply a low pass filter 206 to the motion signal to filter out (e.g., attenuate) high frequency motion signals (e.g., noise).

In some implementations, the mobile device can be configured to sample the filtered motion signal 208 for a period of time (i.e., the sample period). For example, the mobile device can be configured to collect samples of the motion signal over the sample period. The mobile device can sample and store into a buffer five (5) seconds of the filtered motion signal, for example. In some implementations, the motion signal samples can be analyzed to determine the variance of the motion signal 210 during the sample period. For example, the motion signal sample can be passed through a variance filter or other variance calculating function that will determine the variance of the motion signal samples.

Once the variance of the motion signal samples is determined, the variance can be compared to a variance threshold value 212 to determine if the variance threshold value has been exceeded by the motion signal samples. For example, if the variance of the motion signal samples is greater than the motion variance threshold, then the mobile device can determine that the mobile device is located or positioned on the user's body 214. If the variance of the motion signal samples is not greater than the motion variance threshold, then the mobile device can compare the amount of time that has passed since the voice call was connected (e.g., $T_{current} - T_0$) to a threshold period of time 216. For example, if the threshold period of time has elapsed since the voice call was connected and the variance of the motion signal (as determined from the motion signal samples) has not exceeded the variance threshold within the threshold period of time, then the mobile device can determine that the mobile device is located on a stationary object 218 and not located on the user.

If the threshold period of time has not elapsed since the call was connected, then the mobile device can collect another set of motion signal samples 208 and determine whether the variance of the motion signal samples 210 exceeds the variance threshold 212. Collecting samples and comparing the variance of the samples to the variance threshold can continue until the threshold period of time has elapsed 216 and the on object location 218 of the mobile device is determined. If the variance of a set of motion signal samples 210 exceeds the variance threshold 212 before the threshold period of time has elapsed, then an on user location 214 location of the mobile device can be determined.

In some implementations, the mobile device can determine that the threshold period of time has elapsed using a counter. For example, if the threshold period of time is one minute and the sample period is ten seconds, then the mobile device can determine that the threshold period of time has elapsed after six motion signal samples have been taken. Thus, in some implementations, each time the mobile device determines whether the threshold period of time has elapsed 216, the mobile device can increment a counter (e.g., starting from zero). Once the counter has reached a number (n) equal to the threshold period of time divided by the sample period (n=threshold period/sample period), then the mobile device can determine that the mobile device is on a stationary object 218, as described above.

In some implementations, when a voice call is connected 202, the mobile device can be configured to adjust the transmit power of the telephony components of the mobile device to a low power level as if it has determined that the mobile device is being worn on the user's body. For example, the mobile device can be configured to default or initialize to the on body location. After the threshold period of time has passed 216, and if the variance of the motion signal never exceeds the threshold variance 212, then the mobile device can determine that the mobile device is located or positioned on a stationary object and can increase the transmit power to a high power level.

Figure 3:
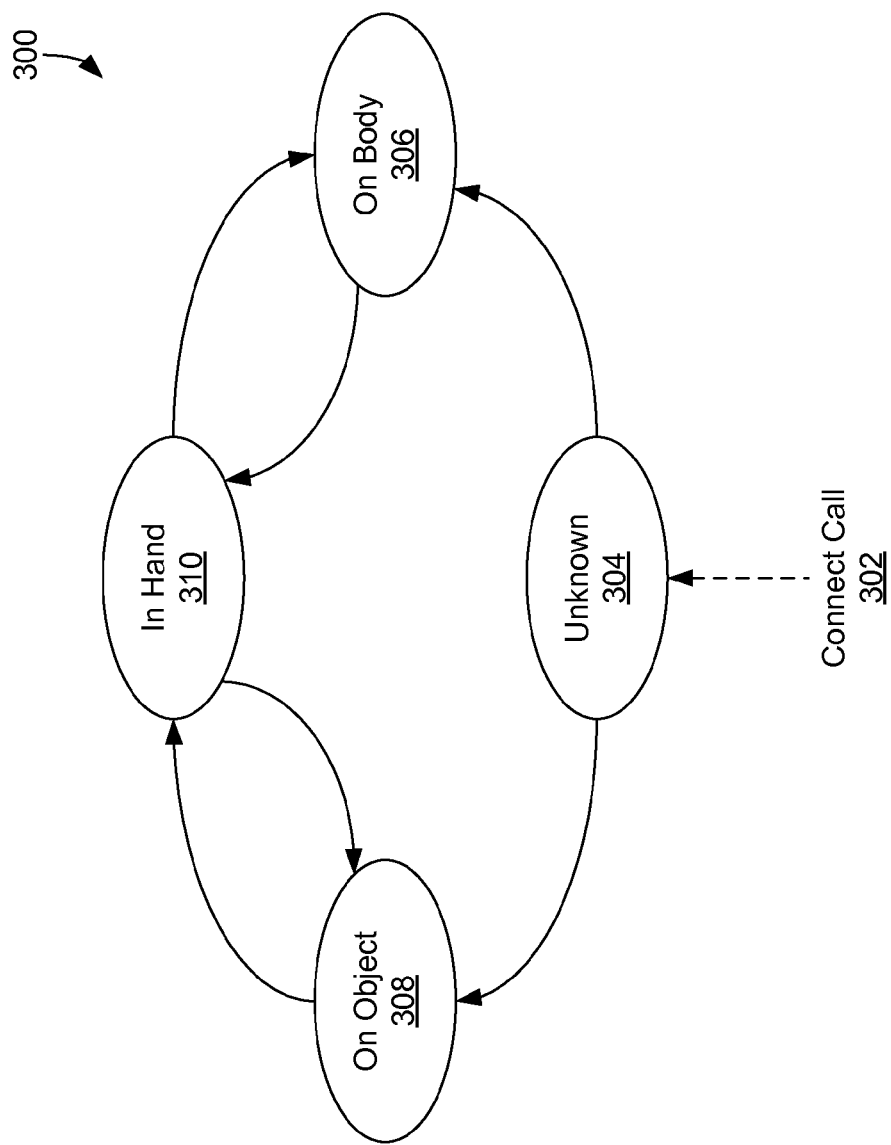
FIG. 3 illustrates an example state machine for determining the whether the mobile device is on a stationary object or on the user's body.

FIG. 3 illustrates an example state machine 300 for determining the whether the mobile device is on a stationary object or on the user's body. For example, state machine 300 can be used to determine where the mobile device is currently positioned (e.g., on a stationary object, on the user's body). The mobile device can use the current state of the state machine 300 to determine whether to adjust the transmit power of the mobile device.

In some implementations, the mobile device can be configured to start in an unknown state 304 when a voice call is connected 302. In some implementations, the mobile device can be configured to start in the on body state 306 when a call is connected 302. Once the call is connected, the mobile device can monitor the movement of the mobile device to determine a stationary object 308 or on body 306 position for the mobile device, as described above with reference to FIG. 2. For example, if an on stationary object location (e.g., on table) is determined, then the state machine 300 can transition from unknown state 304 to on object state 308. If an on body location (e.g., on user's lap, in user's pocket) is determined, then the state machine 300 can transition from unknown state 304 to on body state 306.

In some implementations, the state machine 300 can include an in hand state 310 for transitioning between the on object state 308 and on body state 306. For example, if the mobile device is on an object, such as a table, the user will likely pick up the mobile device before putting the mobile device on the user's body (e.g., in the user's pocket, on the user's lap). If the mobile device is on the user's body, the user will likely pick up the mobile device before putting the mobile device on a stationary object. In either case, the mobile device will be held in the user's hand during the transition from an on body location to an on object location or from an on object location to an on body location.

Similarly, the state machine 300 can be configured with an in hand state 310 for transitioning between on object state 308 and on body state 306. For example, once in the on object state 308 or the on body state 306 the mobile device can continue analyzing motion data (e.g., motion signal) from the mobile device's motion sensor. If the motion data indicates a pattern of motion consistent with the mobile device being picked up or held in hand, the state machine 300 can transition from on object state 308 or on body state 306 to in hand state 310.

In some implementations, when the state machine 300 indicates that the mobile device is in the in hand state 310, the mobile device can perform process 200 to determine whether to transition to on object state 308 or on body state 306. For example, when the state machine 300 is in the in hand state 310, the mobile device can perform steps 204-218 of process 200 to determine whether and when to transition from the in hand state 310 to the on body state 306 or on object state 308.

Figure 4:
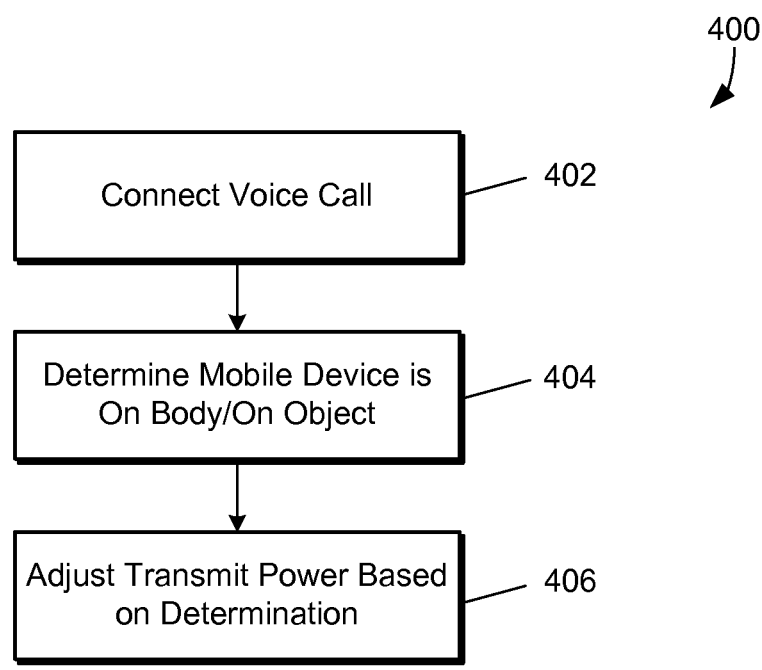
FIG. 4 is flow diagram of an example process for adjusting the transmit power of a mobile device based on a user body location of the mobile device.

FIG. 4 is flow diagram of an example process 400 for adjusting the transmit power of a mobile device based on a user body location of the mobile device. At step 402, the mobile device can connect to a voice call. For example, a user can use the mobile device to initiate or receive voice calls (e.g., telephone call) on the mobile device.

At step 404, the mobile device can determine whether the mobile device is on the user's body or on an object. For example, the mobile device can perform process 200 of FIG. 2 and/or use state machine 300 of FIG. 3 to determine whether the mobile device is located on the user's body (e.g., in pocket, on lap, etc.) or on a stationary object (e.g., table, desk, floor, etc.).

At step 406, the mobile device can adjust the transmit power of the mobile device based on the location or position of the mobile device. For example, if the mobile device is on the user's body, the mobile device can reduce the transmit power of the mobile device to a predetermined low power level. If the mobile device is on a stationary object (e.g., away from the user's body), then the mobile device can increase the transmit power of the mobile device to a predetermined high power level.

Application Programming Interfaces

One or more Application Programming Interfaces (APIs) may be used in implementations described herein. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some implementations, the API-implementing component may provide more than one API, that provide access to different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other implementations, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (e.g., the API-implementing component and the API-calling component may be the same or different type of module from each other). API-implementing components may in some cases be embodied at least in part in firmware, microcode, or other hardware logic.

In some implementations, an API may allow a client program to use the services provided by a Software Development Kit (SDK) library. In other embodiments an application or other client program may use an API provided by an Application Framework. In these implementations, the application or client program may incorporate calls to functions or methods provided by the SDK and/or provided by the API or use data types or objects defined in the SDK and provided by the API. An Application Framework may in these implementations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (e.g., on the same data processing system as the API-implementing component) or a remote component (e.g., on a different data processing system from the API-implementing component) that communicates with the API-implementing component through the API over a network. An API-implementing component may also act as an API-calling component (e.g., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component, thus the API may include features for translating calls and returns between the API-implementing component and the API-calling component. However the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 5:
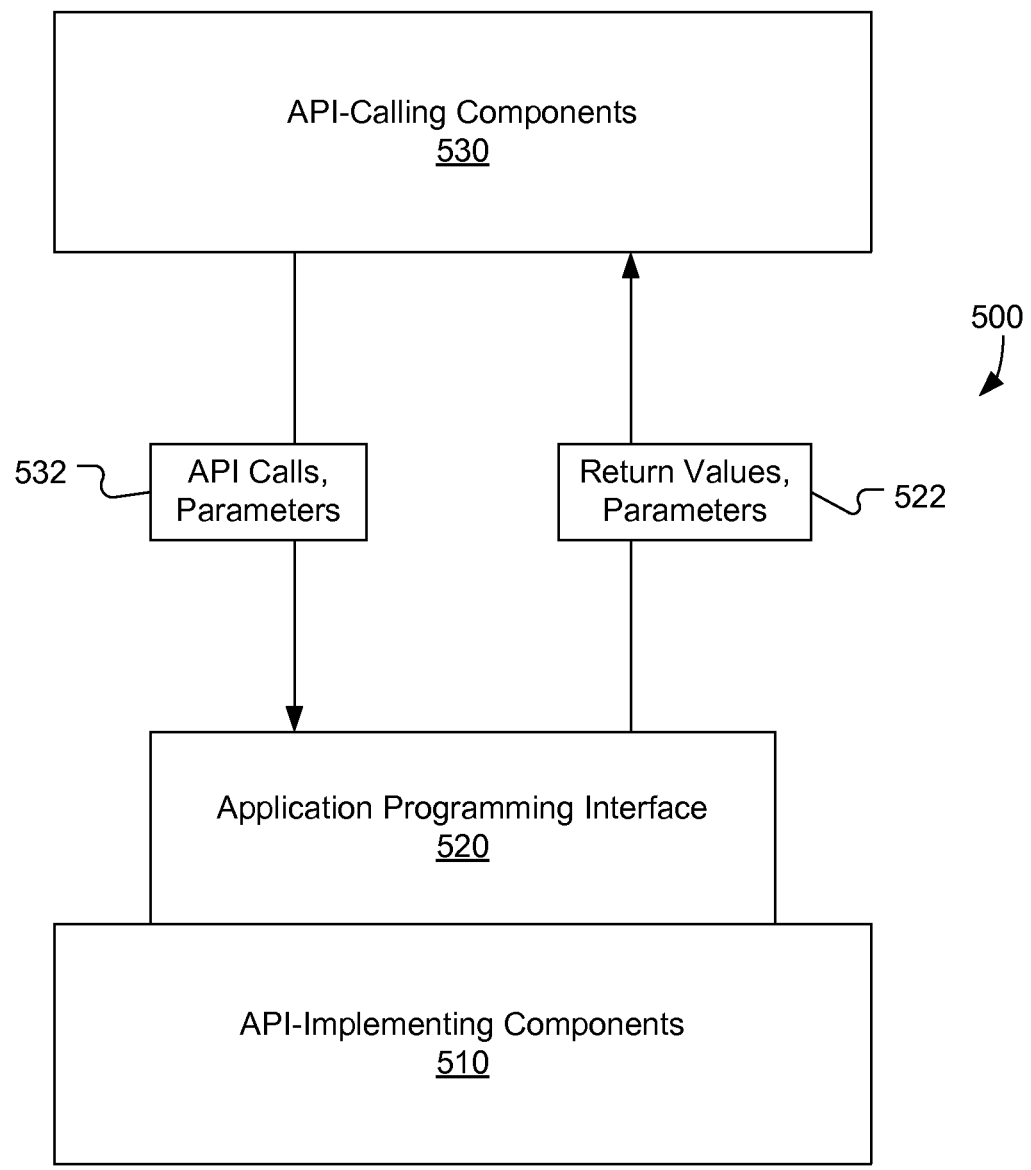
FIG. 5 is a block diagram illustrating an example API architecture, which can be used in some implementations.

FIG. 5 is a block diagram illustrating an example API architecture 500, which can be used in some implementations. As shown in FIG. 5, the API architecture 500 includes the API-implementing component 510 (e.g., an operating system, a library, a device driver, an API, an application program, software or other module) that implements the API 520. The API 520 can specifiy one or more functions, methods, classes, objects, protocols, data structures, formats and/or other features of the API-implementing component that may be used by the API-calling component 530. The API 520 can specify at least one calling convention that specifies how a function in the API-implementing component receives parameters 532 from the API-calling component and how the function returns a result 522 to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

For example, the API-implementing component 510 can include additional functions, methods, classes, data structures, and/or other features that are not specified through the API 520 and are not available to the API-calling component 530. The API-calling component 530 may be on the same system as the API-implementing component 510 or may be located remotely and accesses the API-implementing component 510 using the API 520 over a network. While FIG. 5 illustrates a single API-calling component 530 interacting with the API 520, other API-calling components, which may be written in different languages (or the same language) than the API-calling component 530, may use the API 520.

The API-implementing component 510, the API 520, and the API-calling component 530 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 6:
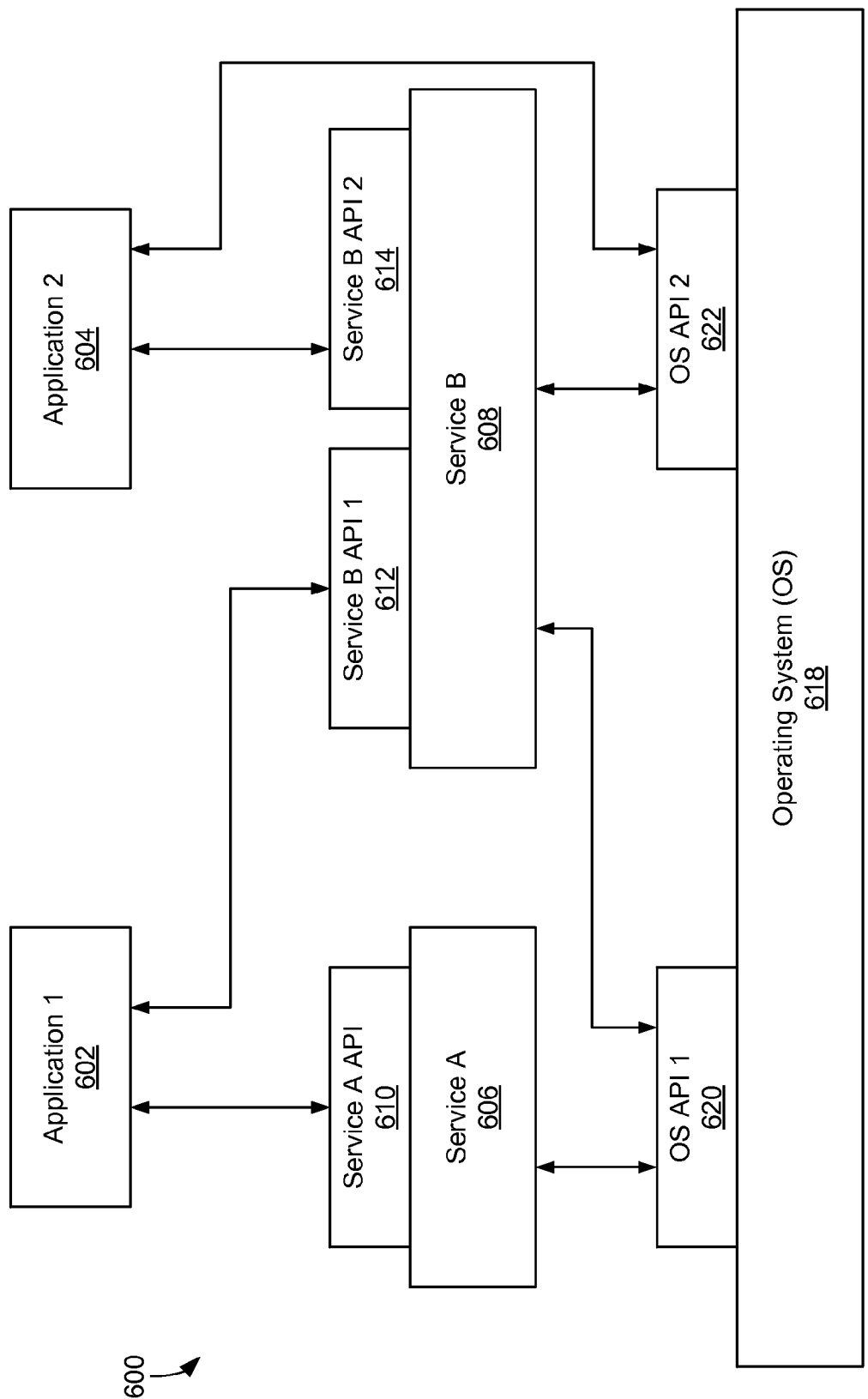
FIG. 6 illustrates an example software stack that includes various application programming interfaces.

FIG. 6 illustrates an example software stack 600 that includes various application programming interfaces. As illustrated by FIG. 6, applications 602 and 604 can make calls to Service A 606 or Service B 608 using several Service APIs 610-616 and to Operating System (OS) 618 using several OS APIs 620-622. Service A 606 or Service B 608 can make calls to OS using several OS APIs 620-622.

Note that the Service B 608 has two APIs 612 and 614, one of which, Service B API 1 612, receives calls from and returns values to Application 1 602 and the other, Service B API 2 614, receives calls from and returns values to Application 2 604. Service A 606 (which can be, for example, a software library) makes calls to and receives returned values from OS API 1 620, and Service B 622 (which can be, for example, a software library) makes calls to and receives returned values from both OS API 1 620 and OS API 2 622. Application 2 604 makes calls to and receives returned values from OS API 2 622.

Example System Architecture

Figure 7:
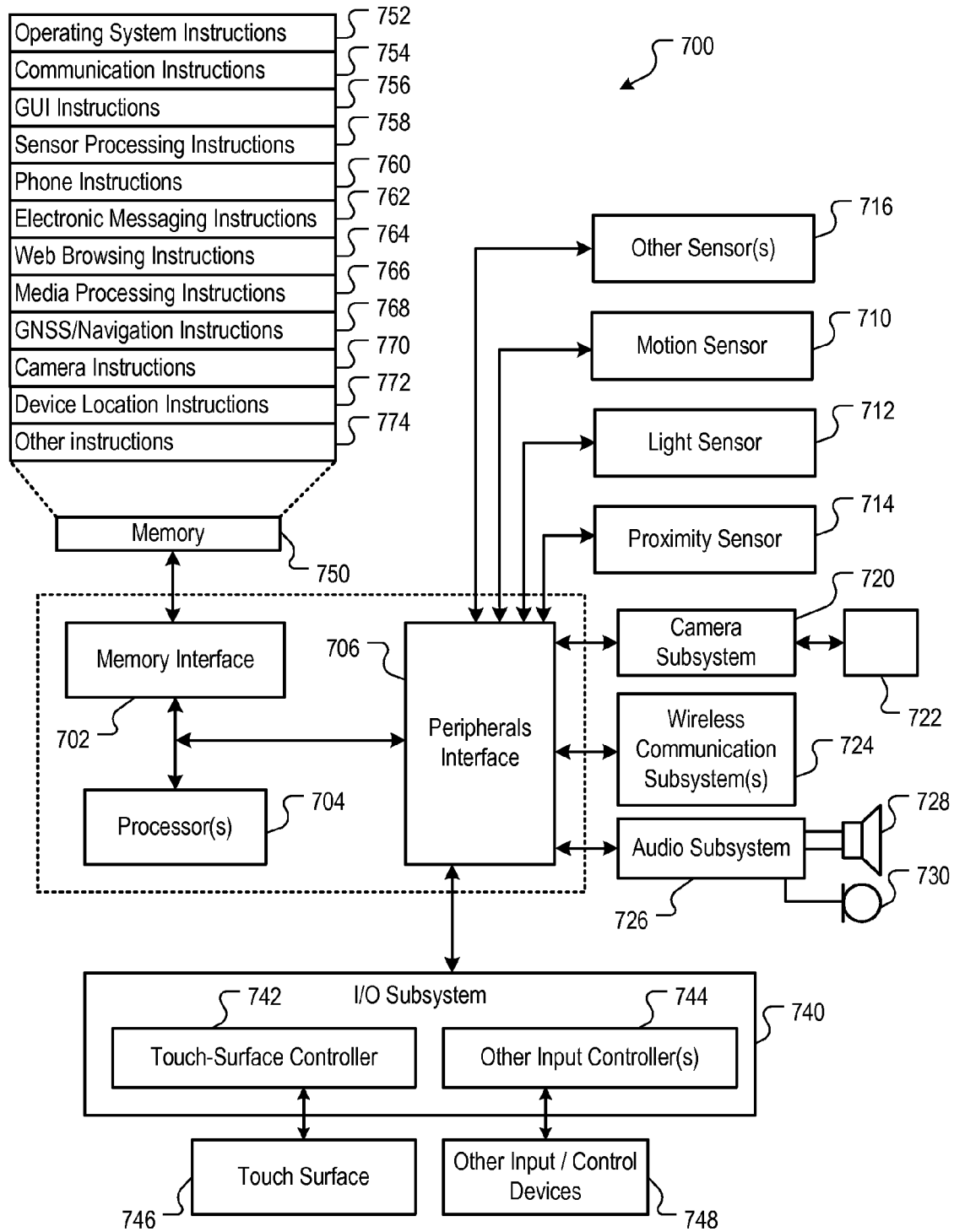
FIG. 7 is a block diagram of an example computing device that can implement the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™. The computing device 700 can, therefore, include a 36-pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for determining whether the mobile device is on a user's body or on a stationary object and adjusting the transmit power of the mobile device accordingly. For example, operating system 752 can implement the mobile device locating and transmission power adjustment features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions. The memory 750 can store software instructions 772 to facilitate other processes and functions, such as the mobile device locating and transmission power adjustment processes and functions as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A method comprising:
    connecting, by a mobile device, a voice call for a user of the mobile device, wherein connecting the voice call causes one or more radio frequency transmitters of the mobile device to transmit radio waves at a first power level;
    collecting motion signal samples from a motion sensor of the mobile device, each motion signal sample indicating a respective magnitude of motion of the mobile device;
    calculating a statistical variance of the motion signal samples;
    determining a length of time that has passed since the voice call was connected;
    distinguishing between the mobile device being on the user's body and the mobile device being on an inanimate object based on the calculated statistical variance of the motion signal samples and the length of time that has passed since the voice call was connected; and
    adjusting the transmit power level from the first power level to a second power level based on distinguishing between the mobile device being on the user's body and the mobile device being on an inanimate object.

2. The method of claim 1, further comprising:
    determining that the mobile device is on the user's body; and
    adjusting the transmit power level to a low power level when the mobile device is on the user's body.

3. The method of claim 1, further comprising:
    determining that the mobile device is on an inanimate object; and
    adjusting the transmit power level to a high power level when the mobile device is on an inanimate object.

4. A non-transitory computer-readable medium including one or more sequences of instructions which, when executed by one or more processes, causes:
    connecting, by a mobile device, a voice call for a user of the mobile device, wherein connecting the voice call causes one or more radio frequency transmitters of the mobile device to transmit radio waves at a first power level;
    collecting motion signal samples from a motion sensor of the mobile device, each motion signal sample indicating a respective magnitude of motion of the mobile device;

calculating a statistical variance of the motion signal samples;

determining a length of time that has passed since the voice call was connected;

distinguishing between the mobile device being on the user's body and the mobile device being on an inanimate object based on the calculated statistical variance of the motion signal samples and the length of time that has passed since the voice call was connected;

adjusting the transmit power level from the first power level to a second power level based on distinguishing between the mobile device being on the user's body and the mobile device being on an inanimate object.

5. The non-transitory computer-readable medium of claim 4, wherein the instructions cause:

determining that the mobile device is on the user's body; and adjusting the transmit power level to a low power level when the mobile device is on the user's body.

6. The non-transitory computer-readable medium of claim 4, wherein the instructions cause:

determining that the mobile device is on an inanimate object; and adjusting the transmit power level to a high power level when the mobile device is on an inanimate object.

7. A system comprising:

one or more processors; and a non-transitory computer-readable medium including one or more sequences of instructions which, when executed by the one or more processes, causes:

connecting, by a mobile device, a voice call for a user of the mobile device, wherein connecting the voice call causes one or more radio frequency transmitters of the mobile device to transmit radio waves at a first power level;

collecting motion signal samples from a motion sensor of the mobile device, each motion signal sample indicating a respective magnitude of motion of the mobile device;

calculating a statistical variance of the motion signal samples;

determining a length of time that has passed since the voice call was connected;

distinguishing between the mobile device being on the user's body and the mobile device being on an inanimate object based on the calculated statistical variance of the motion signal samples and the length of time that has passed since the voice call was connected; and adjusting the transmit power level from the first power level to a second power level based on distinguishing between the mobile device being on the user's body and the mobile device being on an inanimate object.

8. The system of claim 7, wherein the instructions cause:

determining that the mobile device is on the user's body; and adjusting the transmit power level to a low power level when the mobile device is on the user's body.

9. The system of claim 7, wherein the instructions cause:

determining that the mobile device is on an inanimate object; and adjusting the transmit power level to a high power level when the mobile device is on an inanimate object.

10. The method of claim 1, wherein distinguishing between the mobile device being on the user's body and the mobile device being on an inanimate object comprises:

determining that the statistical variance of motion signals does not exceed a threshold variance value;

determining that the length of time that has passed since the voice call was connected exceeds a threshold time value; and upon determining that the statistical variance of motion signals does not exceed a threshold variance value and determining that the length of time that has passed since the voice call was connected exceeds a threshold time value, determining that the mobile device is on the inanimate object.

11. The method of claim 1, wherein distinguishing between the mobile device being on the user's body and the mobile device being on an inanimate object comprises:

determining that the statistical variance of motion signals does not exceed a threshold variance value;

determining that the length of time that has passed since the voice call was connected does not exceed a threshold time value; and upon determining that the statistical variance of motion signals does not exceed a threshold variance value and determining that the length of time that has passed since the voice call was connected does not exceed a threshold time value, collecting additional motion signal samples from the motion sensor of the mobile device.

12. The method of claim 1, further comprising:

obtaining additional motion data describing additional movement of the mobile device; and determining whether the mobile device is in a transition state between the user's body and the inanimate object based on the additional motion data.

13. The non-transitory computer-readable medium of claim 4, wherein distinguishing between the mobile device being on the user's body and the mobile device being on an inanimate object comprises:

determining that the statistical variance of motion signals does not exceed a threshold variance value;

determining that the length of time that has passed since the voice call was connected exceeds a threshold time value; and upon determining that the statistical variance of motion signals does not exceed a threshold variance value and determining that the length of time that has passed since the voice call was connected exceeds a threshold time value, determining that the mobile device is on the inanimate object.

14. The non-transitory computer-readable medium of claim 4, wherein distinguishing between the mobile device being on the user's body and the mobile device being on an inanimate object comprises:

determining that the statistical variance of motion signals does not exceed a threshold variance value;

determining that the length of time that has passed since the voice call was connected does not exceed a threshold time value; and upon determining that the statistical variance of motion signals does not exceed a threshold variance value and determining that the length of time that has passed since the voice call was connected does not exceed a threshold time value, collecting additional motion signal samples from the motion sensor of the mobile device.

15. The non-transitory computer-readable medium of claim 4, wherein the instructions cause:

obtaining additional motion data describing additional movement of the mobile device; and determining whether the mobile device is in a transition state between the user's body and the inanimate object based on the additional motion data.

16. The system of claim 7, wherein distinguishing between the mobile device being on the user's body and the mobile device being on an inanimate object comprises:
   determining that the statistical variance of motion signals does not exceed a threshold variance value;
   determining that the length of time that has passed since the voice call was connected exceeds a threshold time value; and
   upon determining that the statistical variance of motion signals does not exceed a threshold variance value and determining that the length of time that has passed since the voice call was connected exceeds a threshold time value, determining that the mobile device is on the inanimate object.

17. The system of claim 7, wherein distinguishing between the mobile device being on the user's body and the mobile device being on an inanimate object comprises:
   determining that the statistical variance of motion signals does not exceed a threshold variance value;
   determining that the length of time that has passed since the voice call was connected does not exceed a threshold time value; and
   upon determining that the statistical variance of motion signals does not exceed a threshold variance value and determining that the length of time that has passed since the voice call was connected does not exceed a threshold time value, collecting additional motion signal samples from the motion sensor of the mobile device.

18. The system of claim 7, wherein the instructions cause:
   obtaining additional motion data describing additional movement of the mobile device; and
   determining whether the mobile device is in a transition state between the user's body and the inanimate object based on the additional motion data.

* * * * *